(12) United States Patent
Diard

(10) Patent No.: US 8,593,472 B1
(45) Date of Patent: Nov. 26, 2013

(54) SYSTEM AND METHOD FOR ACCESSING A FRAME BUFFER VIA A STORAGE DRIVER

(75) Inventor: Franck Diard, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 1064 days.

(21) Appl. No.: 12/534,033

(22) Filed: Jul. 31, 2009

(51) Int. Cl.
*G06F 13/00* (2006.01)
*G06F 12/10* (2006.01)

(52) U.S. Cl.
USPC ............................ 345/538; 345/537; 345/568

(58) Field of Classification Search
USPC ......................................... 345/537, 538, 568
See application file for complete search history.

(56) References Cited

U.S. PATENT DOCUMENTS

| | | | |
|---|---|---|---|
| 5,754,817 A * | 5/1998 | Wells et al. ................... | 711/203 |
| 6,412,043 B1 * | 6/2002 | Chopra et al. ................ | 711/118 |
| 6,523,102 B1 * | 2/2003 | Dye et al. ..................... | 711/170 |
| 6,760,787 B2 * | 7/2004 | Forin ............................. | 710/18 |
| 7,013,456 B1 * | 3/2006 | Van Dyke et al. ............ | 717/130 |
| 7,039,769 B2 * | 5/2006 | Castelli et al. ............... | 711/147 |
| 2005/0120194 A1 * | 6/2005 | Kissell .......................... | 712/242 |
| 2006/0242710 A1 * | 10/2006 | Alexander .................... | 726/24 |
| 2009/0307458 A1 * | 12/2009 | Nogueras et al. ............ | 711/173 |
| 2010/0095075 A1 * | 4/2010 | Ganesh et al. ............... | 711/161 |

* cited by examiner

*Primary Examiner* — David T Welch
(74) *Attorney, Agent, or Firm* — Patterson + Sheridan, L.L.P.

(57) ABSTRACT

One embodiment of the invention sets forth a mechanism for retrieving and storing data from/to a frame buffer via a storage driver included in a GPU driver. The storage driver includes three separate routines, the registration engine, the page-fault routine and the write-back routine, that facilitate the transfer of data between the frame buffer and the system memory. The registration engine registers a file system, corresponding to the frame buffer, the page-fault routine and the write-back routine with the VMM. The page-fault routine causes a portion of data stored in a specific memory location in the frame buffer to be transmitted to a corresponding memory location in the application memory. The write-back routine causes data stored in a particular memory location in the application memory to be transmitted to a corresponding memory location in the frame buffer.

21 Claims, 5 Drawing Sheets

SYSTEM AND METHOD FOR ACCESSING A FRAME BUFFER VIA A STORAGE DRIVER

BACKGROUND OF THE INVENTION

1. Field of the Invention

The present invention relates generally to the field of external memory access and, more specifically, to a system and method for accessing a frame buffer via a storage driver.

2. Description of the Related Art

A graphics processing unit (GPU) within a computing device is configured to efficiently process complex graphics and numerical computations. To take advantage of the processing capabilities of the GPU, an application, such as a CUDA application, executing on a central processing unit (CPU) within the computing device typically off-loads computationally expensive tasks to the GPU. In turn, the GPU processes the computationally expensive tasks and returns the results to the application.

Traditionally, the entire data set reflecting the processed results is returned to the application, even when the application may need to access only a subset of the data set. For example, suppose that the entire data set 500 kilobytes (KB), but the application needs to access only a 4 KB portion of the data set. In operation, the entire 500 KB data set would be transmitted by the GPU to the application so that the 4 KB portion can be accessed. Further, if the application were to modify the 4 KB portion of the data set, then the application would have to re-transmit the entire data set, including the modified 4 KB portion, to the GPU so that the GPU can perform additional processing operations on the data set or a portion of the data set. As the foregoing illustrates, in many situations, the entire data set being processed or accessed by the application is transmitted back and forth several times between the application and the GPU during operation.

One clear drawback to this architecture is that data transfer bandwidth between the CPU and the GPU is unnecessarily wasted since the entire data set is transmitted back and forth between the two processors when only a subset of the data set is needed. Further, architectures that require the transmission and retrieval of large quantities of data can substantially reduce the overall performance of the computer system.

As the foregoing illustrates, what is needed in the art is an efficient mechanism for providing more granular control when transmitting data between an application and a GPU.

SUMMARY OF THE INVENTION

One embodiment of the present invention sets forth a method for retrieving data from and storing data to a buffer memory coupled to a first processing unit within a computer system. The method includes the steps of registering a file system and a page-fault routine with a virtual memory manager executing on a second processing unit within the computer system, where each memory location in the file system corresponds to a different memory location in the buffer memory, and receiving a page-in request from the virtual memory manager that includes a first memory location within the file system that corresponds to a second memory location within the buffer memory, and where data requested by an application executing on the second processing unit is stored within the buffer memory at the second memory location. The method also includes the steps of programming a set of processor registers associated with the first processing unit based on a first set of instructions in response to the page-in request, where a first instruction in the first set of instructions causes the data requested by the application to be transmitted from the second memory location within the buffer memory to a third memory location within a memory coupled to the second processing unit for storage, and transmitting a completion notification to the virtual memory manager indicating that the data requested by the application has been transmitted to the third memory location.

One advantage of the disclosed method is that only portions of data that are needed by applications executing on the second processing unit are retrieved from the buffer memory coupled to the first processing unit. Such a mechanism conserves the data transfer bandwidth between the first processing unit and the second processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one skilled in the art that the present invention may be practiced without one or more of these specific details. In other instances, well-known features have not been described in order to avoid obscuring the present invention.

Figure 1:
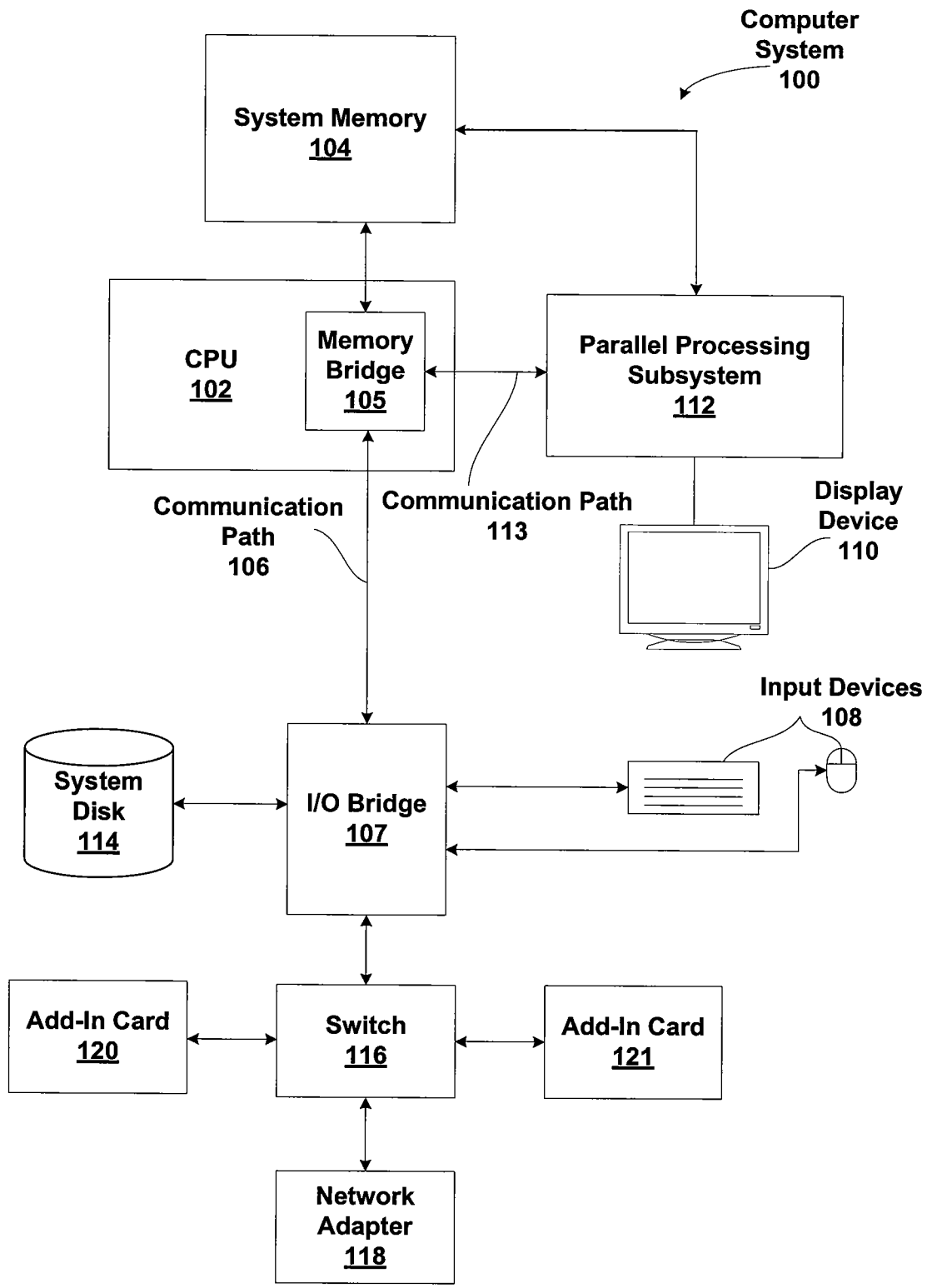
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes a central processing unit (CPU) 102 and a system memory 104 communicating via a bus path through a memory bridge 105. Memory bridge 105 may be integrated into CPU 102 as also shown, or alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105.

A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor). The parallel processing subsystem 112 incorporates circuitry optimized for graphics and video processing, including, for example, video output circuitry, and constitutes a graphics processing unit (GPU). In one embodiment, the parallel processing subsystem 112 incorporates circuitry optimized for general purpose processing, while preserving the underlying computational architecture, described in greater detail herein. In another embodiment, the parallel processing subsystem 112 may be integrated with one or more other system elements, such as the memory bridge 105, CPU 102, and I/O bridge 107 to form a system on chip (SoC).

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107.

Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and communication between different devices may use different protocols as is known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
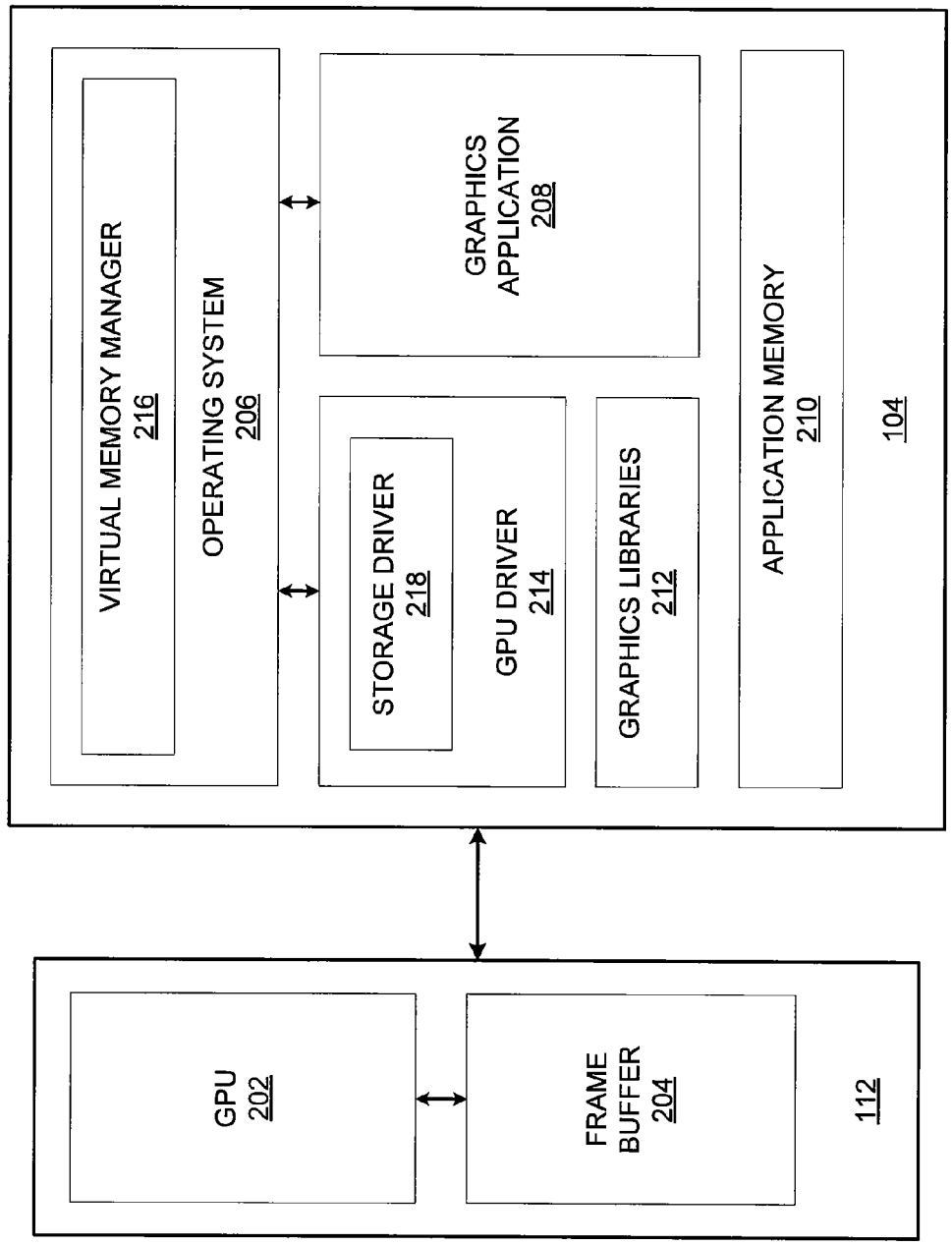
FIG. 2 is a more detailed view of the system memory of FIG. 1, according to one embodiment of the present invention.

FIG. 2 illustrates a detailed view of the system memory 104 and the parallel processing subsystem 112 of FIG. 1, according to one embodiment of the present invention. As shown, the graphics subsystem 112 includes a graphics processing unit (GPU) 202 and a frame buffer 204.

The GPU 202 is a graphics processor with a rendering pipeline that can be configured to perform various tasks related to generating pixel data from graphics data supplied by CPU 102 and/or system memory 104. The GPU 202 also interacts with the frame buffer 204 to store and update pixel data, delivers pixel data to display device 110, and the like. In some embodiments, the parallel processing subsystem 112 may include one or more GPUs 202 that operate as graphics processors and one or more other GPUs 202 that are used for general-purpose computations.

As also shown, the system memory 104 includes an operating system 206, a graphics application 208, an application memory 210, graphics libraries 212, and a GPU driver 214. The operating system 206, the graphics application 208 and the GPU driver 214 are software programs executing on the CPU 102. The operating system 206 is an interface between hardware components and software programs within the computer system 100. Specifically, the operating system 206 is responsible for the coordination of different software programs executing on the CPU 102 and the management of resources within the computer system 100. The operating system 206 may be any operating system, such as Microsoft Windows, Mac OS, Linux or Solaris.

The operating system 206 allocates portions of the system memory 104 to software programs executing on the CPU 102 to store and retrieve data for processing. In operation, the operating system 206 allocates more memory space to the software programs than is physically available in the system memory 104. For example, the system memory 104 may have one gigabyte (GB) of memory space, and the operating system 206 allocates a half gigabyte of memory space to each of four software programs executing on the GPU. As is well known, allocating more memory space than is physically available in the system memory 104 is referred to herein as allocating "virtual memory." Virtual memory allocated to a specific software program maps to a physical portion of the system memory 104 associated with the specific software program.

A virtual memory manager (VMM) 216 within the operating system 206 manages the retrieval and transmission of data associated with allocated virtual memory from/to an additional memory, such as the system disk 114 and the frame buffer 204. When a software program executing on the CPU 102, such as the graphics application 208, accesses a memory location within an allocated virtual memory space, the VMM 216 causes the retrieval of data associated with the memory location for storage in the system memory 104. The software program can then access the data from the system memory 104. Once the software program is no longer accessing and/or processing the data stored in the system memory 104, the VMM 216 causes the data to be transmitted back to the external memory for storage.

The graphics application 208 is a user-defined software program that, among other things, performs complex graphics and numerical operations. The operating system 206 allocates virtual memory space to the graphics application 208 that maps to the application memory 210. The VMM 216 stores mapping information for each virtual memory location to a corresponding physical memory location in the application memory 210. To access a specific virtual memory location, the graphics application 208 transmits a read request to the VMM 216 including the specific virtual memory location. Based on the mapping information, the VMM 216 determines whether data is available in the corresponding physical memory location in the application memory 210. If the data is available, then the VMM 216 retrieves the data from the application memory 210 and transmits the data to the graphics application 208. However, if the data is not available in the application memory 210, then a page-fault occurs and the VMM 216 causes the retrieval of the data from external memory and then transmits the retrieved data to the graphics application 208.

For certain complex computations, such as graphics simulations or fast-fourier transforms (FFTs), the graphics application 208 leverages the parallel-processing capabilities of the GPU 202. The graphics application 208 transmits processing requests to the GPU 202 via the graphics libraries 212. The results of the processing by the GPU 202 are accessed by the graphics application 208 via the VMM 216 operating in conjunction with a storage driver 218 within the GPU driver 214.

Figure 3:
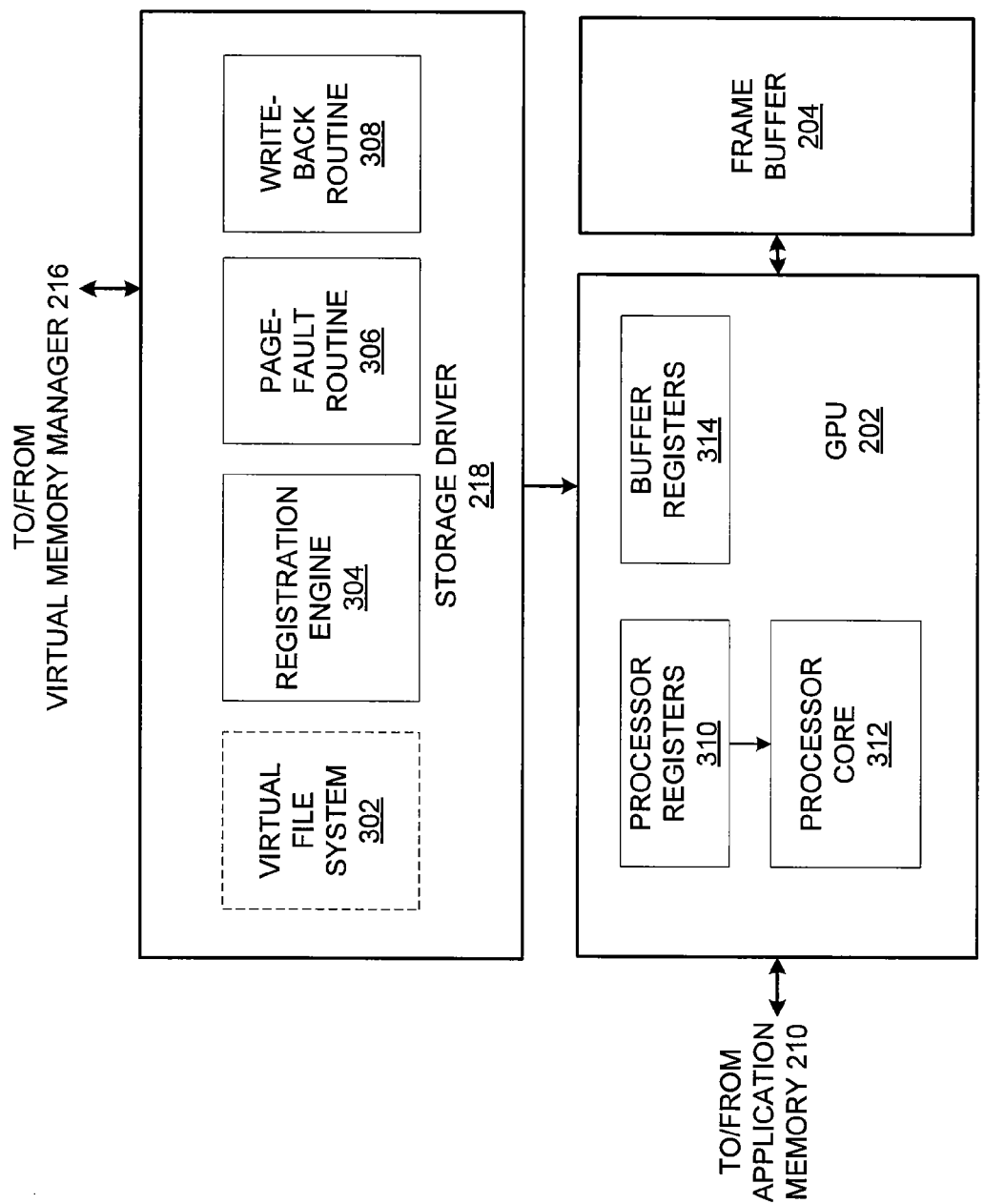
FIG. 3 is a more detailed view of the storage driver and the GPU of FIG. 2, according to one embodiment of the present invention.

FIG. 3 is a more detailed view of the storage driver 218 and the GPU 202 of FIG. 2, according to one embodiment of the present invention. As shown, the storage driver 218 includes a virtual file system 302, a registration engine 304, a page-fault routine 306, and a write-back routine 308. As also shown, the GPU 202 includes processor registers 310, a processor core 312, and frame buffer registers 314.

To allow the graphics application 208 to interface with the frame buffer 204 via the VMM 216, the registration engine 304 in the storage driver 218 registers the virtual file system 302 with the VMM 216 at system-startup. The virtual file system 302 presents a file system configuration for the frame buffer 204 to the VMM 216. The registration engine 304 also registers the page-fault routine 306 and the write-back routine 308 with the VMM 216. When invoked, the page-fault routine 306 causes a portion of data stored in a specific location in the frame buffer 204 to be transmitted to a corresponding location in the application memory 210. Similarly, the write-back routine 308 causes data stored in a particular location in the application memory 210 to be transmitted to a corresponding location in the frame buffer 204.

In operation, the graphics application 208 maps a portion of the application memory 210 to a portion of the frame buffer 204 via the virtual file system 302 registered with the VMM 216. To map the portion of the application memory 210 to a portion of the frame buffer 204, the graphics application 208 first transmits a request to the VMM 216 to open a file in the virtual file system 302 associated with the portion of the frame buffer 204. The graphics application 208 then transmits a request to the VMM 216 to create a mapping between the file in the virtual file system 302 associated with the portion of the frame buffer 204 and the portion of the application memory 210. In response, the VMM 216 returns a virtual memory pointer that is associated with the mapped portion of the application memory 210. The graphics application 208 uses the virtual memory pointer to access and/or modify the data stored in the portion of the frame buffer 204 via the mapped portion of the application memory 210. Mapping a portion of the application memory 210 in such a fashion creates a byte-for-byte correlation between the data stored in the frame buffer 204 and the portion of the application memory 210. Such a mechanism reduces the number of direct read and write operations between the graphics application 208 and the GPU 202, thereby increasing the overall efficiency of the computer system 100.

To access a portion of data stored in a specific memory location in the frame buffer 204, the graphics application 208 transmits a read request to the VMM 216 requesting data from a corresponding memory location in the mapped application memory 210. If the data is available in the corresponding memory location, then the VMM 216 retrieves the data from the mapped application memory 210 and transmits the data to the graphics application 208. However, if the data is not available in the application memory 210, then a page-fault occurs and the VMM 216 transmits a page-in request to the page-fault routine 306 in the storage driver 218. The page-in request includes the specific memory location in the frame buffer 204 that stores the data requested by the graphics application 208.

In response to the page-in request, the page-fault routine 306 causes the data requested by the graphics application 208 to be transmitted from the frame buffer 204 to the application memory 210. The page-fault routine 306 first programs the processor registers 310 in the GPU 202 with instructions that cause the processor core 312 to retrieve the requested data from the frame buffer 204. The instructions in the processor registers 310 also cause the processor core 312 to write the retrieved data in the corresponding portion in the application memory 210. The page-fault routine 306 then transmits a completion notification to the VMM 216 indicating that the requested data is available in the application memory 210. Upon receiving a completion notification from the page-fault routine 306, the VMM 216 retrieves the data from the application memory 210 and transmits the data to the graphics application 208.

Because the data in the mapped portion of the application memory 210 and frame buffer 204 should be synchronized, the VMM 216 tracks the memory locations in the mapped portion of the application memory 210 that have been modified by the graphics application 208. If data stored in the mapped portion is modified, then the VMM 216 transmits a page-out request to the write-back routine 308 within the storage driver 218. The page-out request includes the memory locations in the mapped portion that have been modified by the graphics application 208. In response to the page-out request, the write-back routine 308 programs the buffer registers 314 in the GPU 202 with instructions that cause the data stored in the memory locations in the application memory 210 included in the page-out request to be retrieved from the application memory 210. The retrieved data is then stored in the corresponding memory location in the frame buffer 204.

In one embodiment, the memory locations in the frame buffer 204 are divided into groups, referred to herein as "pages." The page-fault routine 306 causes a page of data associated with the specific memory location included in the page-in request to be retrieved from the frame buffer 204 and stored in the application memory 210. Data included in a previously retrieved page may be immediately available to the graphics application 208, thereby reducing the number of page-in requests received by the VMM 216. Further, in such an embodiment, the page-out request transmitted by the VMM 216 includes the memory location of an entire page of data in the application memory 210 that includes modified data. The write-back routine 308 then causes the entire page of data to be retrieved from the application memory 210 and stored in the frame buffer memory 204.

Figure 4A:
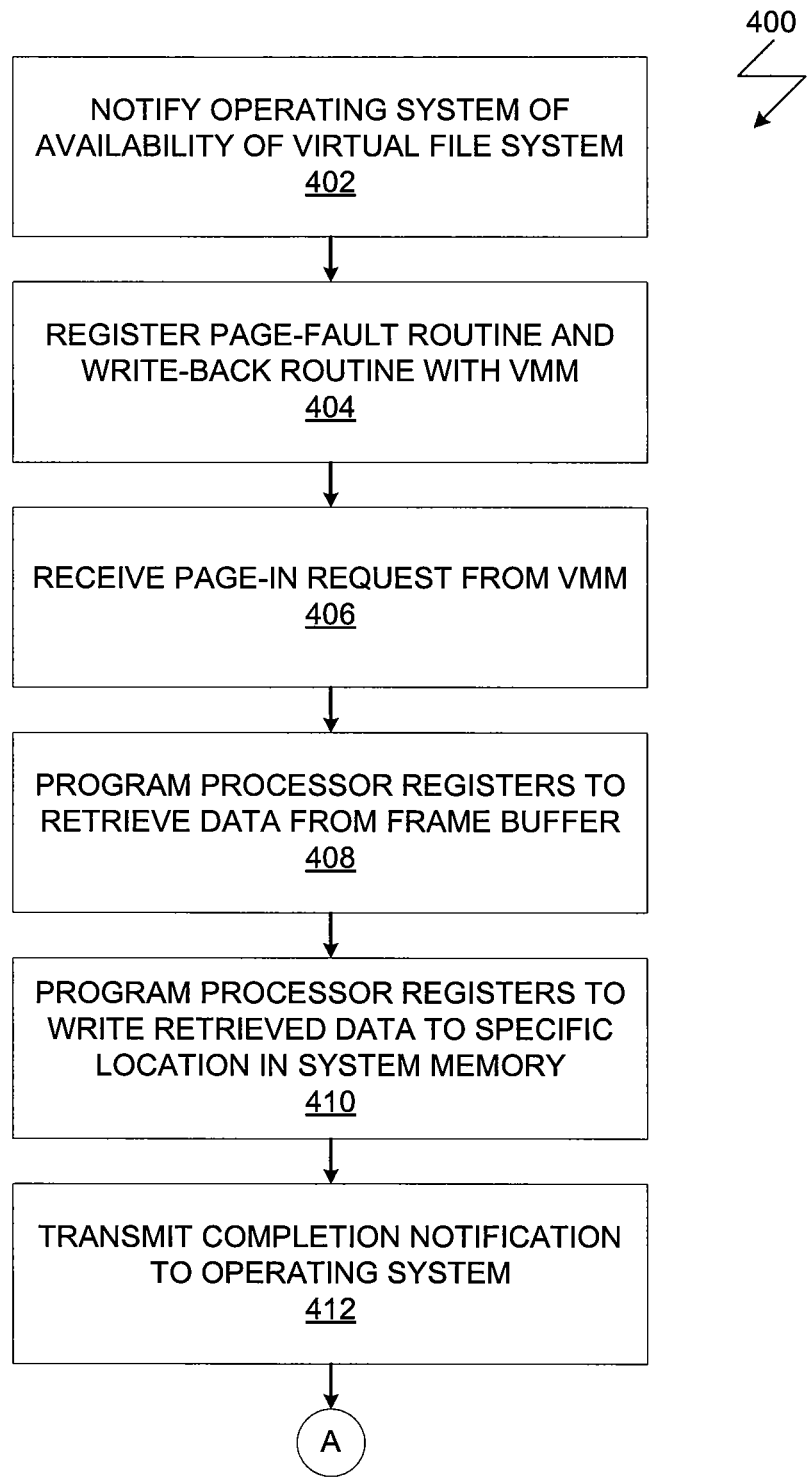
FIGS. 4A and 4B set forth a flow diagram of method steps for retrieving data from and storing data to the frame buffer of the GPU, according to one embodiment of the present invention.
Figure 4B:
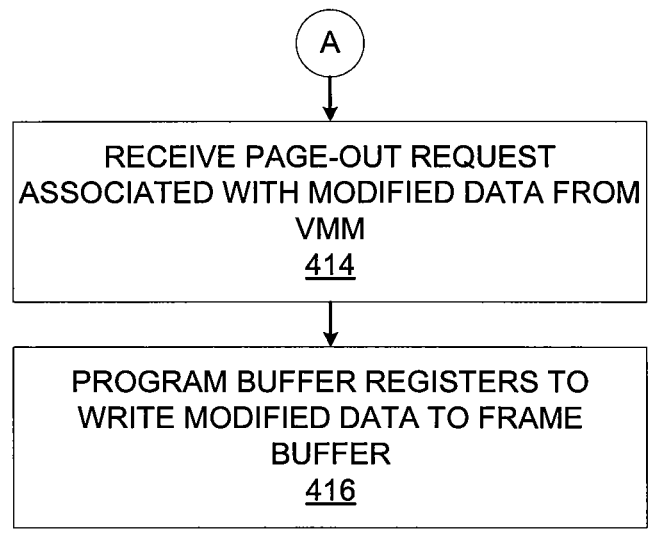

FIGS. 4A and 4B set forth a flow diagram of method steps for retrieving data from and storing data to the frame buffer 204 of the GPU 202, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the registration engine 304 notifies the operating system 206 of the availability of the virtual file system 302 by registering the virtual file system 302 with the VMM 216. At step 404, the registration engine 304 also registers the page-fault routine 306 and the write-back routine 308 within the storage driver 218 with the VMM 216. As previously described, the page-fault routine 306 causes a portion of data stored in a specific memory location in the frame buffer 204 to be transmitted to a corresponding memory location in the application memory 210. Similarly, the write-back routine 308 causes data stored in a particular memory location in the application memory 210 to be transmitted to a corresponding memory location in the frame buffer 204.

At step 406, the page-fault routine 306 receives a page-in request from the VMM 216. As previously described, a page-in request is transmitted by the VMM 216 when the graphics application 208 requests data from a portion of the application memory 210 that is mapped to the frame buffer 204 and the data is not available in the application memory 210. The page-in request includes the specific memory location in the frame buffer 204 that stores the data requested by the graphics application 208.

At step 408, in response to the page-in request, the page-fault routine 306 programs the processor registers 310 in the GPU 202 with instructions that cause the processor core 312 to retrieve the requested data from the specific memory location in the frame buffer 204. At step 410, the page-fault routine 306 also programs the processor registers 310 with instructions that cause the processor core 312 to write the retrieved data in the corresponding memory location in the application memory 210. At step 412, the page-fault routine 306 transmits a completion notification to the VMM 216 indicating that the requested data is available in the corresponding memory location in the application memory 210.

Again, the graphics application 208 may modify data stored in the mapped portion of the application memory 210. In the case of such a modification, the VMM 216 transmits a page-out request to the write-back routine 308. At step 414, the write-back routine 308 receives the page-out request that includes the memory locations in the mapped portion that have been modified by the graphics application 208. At step 416, in response to the page-out request, the write-back routine 308 programs the buffer registers 314 in the GPU 202 with instructions that cause the data stored in the memory locations in the application memory 210 included in the page-out request to be retrieved from the application memory 210. The retrieved data is then stored in the corresponding memory location in the frame buffer 204.

In sum, the storage driver within the GPU driver interacts with the GPU and the VMM in the OS to retrieve data from and write data to the frame buffer of the GPU. The storage driver includes three separate routines, the registration engine, the page-fault routine and the write-back routine, that facilitate the transfer of data between the frame buffer and the system memory.

The registration engine within the storage driver is invoked by the operating system executing on the CPU at system start-up. The registration engine registers a file system, corresponding to the frame buffer buffer, with the VMM. Once the file system is registered, an application executing on the CPU may map an allocated portion of the system memory to a portion of the frame buffer via the file system. The registration engine also registers the page-fault routine and the write-back routine present within the storage driver with the VMM. The VMM invokes the page-fault routine and the write-back routine to transmit data between the frame buffer and the allocated portion of the system memory.

When the application attempts to access a specific memory location within the allocated portion of the system memory that is mapped to a particular memory location in the frame buffer, the VMM invokes the page-fault routine within the storage driver. The page-fault routine stores instructions in a set of processor registers within the GPU that cause the GPU to retrieve the data stored in the frame buffer associated with the particular memory location. The GPU then transmits the data to the specific memory location within the system memory for storage. The page-fault routine then transmits a completion notification to the VMM indicating that the relevant data is stored in the system memory and may be accessed by the application.

When the application modifies data stored in a specific memory location within the system memory that is mapped to a particular memory location in the frame buffer, the VMM invokes the write-back routine within the storage driver. The write-back routine stores instructions in a set of buffer registers within the GPU that cause the GPU to retrieve the modified data from the system memory and store the modified data in the frame buffer at the particular memory location.

One advantage of the disclosed technique is that only the portions of data that are needed by applications executing on the CPU are retrieved from the frame buffer of the GPU. For example, a CUDA application that off-loads computationally expensive operations that produce large data sets to the GPU, accesses only a desired portion of the large data set. Similarly, when accessing large texture maps stored within the frame buffer, applications executing on the CPU access only a desired portion of the texture map. Such a mechanism conserves the data transfer bandwidth between the CPU and the GPU.

Another advantage of the disclosed technique is that only portions of data that are modified by the graphics applications are re-transmitted to the frame buffer of the GPU. This reduces the amount of data that needs to be transmitted back and forth between the CPU and the GPU, thereby increasing the overall performance of the computer system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

I claim:

1. A computer-implemented method for retrieving data from and storing data to a buffer memory coupled to a first processing unit within a computer system, the method comprising:

registering a file system and a page-fault routine with a virtual memory manager executing on a second processing unit within the computer system, wherein each memory location in the file system corresponds to a different memory location in the buffer memory;

receiving a page-in request from the virtual memory manager that includes a first memory location within the file system that corresponds to a second memory location within the buffer memory, and wherein a page requested by an application executing on the second processing unit is stored within the buffer memory at the second memory location;

in response to the page-in request, programming a set of processor registers associated with the first processing unit based on a first set of instructions, wherein a first instruction in the first set of instructions causes the page requested by the application to be transmitted from the second memory location within the buffer memory to a third memory location within a memory coupled to the second processing unit for storage; and transmitting a completion notification to the virtual memory manager indicating that the page requested by the application has been transmitted to the third memory location.

2. The method of claim 1, wherein a second instruction in the first set of instructions causes the page requested by the application to be retrieved from the second memory location.

3. The method of claim 1, wherein the step of registering further comprises registering a write-back routine with the virtual memory manager.

4. The method of claim 3, further comprising the step of receiving a page-out request from the virtual memory manager that includes the third memory location when the page requested by the application is modified by the application.

5. The method of claim 4, further comprising the step of programming a set of buffer registers associated with the buffer memory based on a second set of instructions, wherein a first instruction in the second set of instructions causes the page modified by the application to be retrieved from the third memory location.

6. The method of claim 5, wherein a second instruction in the second set of instructions causes the page modified by the application to be transmitted to the second memory location within the buffer memory for storage.

7. The method of claim 1, further comprising the step of mapping a portion of the memory coupled to the second processing unit to a portion of the buffer memory.

8. The method of claim 1, wherein the page requested by the application is a portion of data processed by the first processing unit for the second processing unit.

9. A non-transitory computer-readable storage medium storing instructions that, when executed by a processor, cause a first processing unit within a computer system to retrieve data from and store data to a buffer memory coupled to the first processing unit, by performing the steps of:
registering a file system and a page-fault routine with a virtual memory manager executing on a second processing unit within the computer system, wherein each memory location in the file system corresponds to a different memory location in the buffer memory;
receiving a page-in request from the virtual memory manager that includes a first memory location within the file system that corresponds to a second memory location within the buffer memory, and wherein a page requested by an application executing on the second processing unit is stored within the buffer memory at the second memory location;
in response to the page-in request, programming a set of processor registers associated with the first processing unit based on a first set of instructions, wherein a first instruction in the first set of instructions causes the page requested by the application to be transmitted from the second memory location within the buffer memory to a third memory location within a memory coupled to the second processing unit for storage; and
transmitting a completion notification to the virtual memory manager indicating that the page requested by the application has been transmitted to the third memory location.

10. The non-transitory computer-readable storage medium of claim 9, wherein a second instruction in the first set of instructions causes the page requested by the application to be retrieved from the second memory location.

11. The non-transitory computer-readable storage medium of claim 9, wherein the step of registering further comprises registering a write-back routine with the virtual memory manager.

12. The non-transitory computer-readable storage medium of claim 11, further comprising the step of receiving a page-out request from the virtual memory manager that includes the third memory location when the page requested by the application is modified by the application.

13. The non-transitory computer-readable storage medium of claim 12, further comprising the step of programming a set of buffer registers associated with the buffer memory based on a second set of instructions, wherein a first instruction in the second set of instructions causes the page modified by the application to be retrieved from the third memory location.

14. The non-transitory computer-readable storage medium of claim 13, wherein a second instruction in the second set of instructions causes the page modified by the application to be transmitted to the second memory location within the buffer memory for storage.

15. The non-transitory computer-readable storage medium of claim 9, further comprising the step of mapping a portion of the memory coupled to the second processing unit to a portion of the buffer memory.

16. The non-transitory computer-readable storage medium of claim 9, wherein the page requested by the application is a portion of data processed by the first processing unit for the second processing unit.

17. A computer system, comprising:
a first processing unit coupled to a buffer memory and associated with a set of processor registers;
a second processing unit coupled to a memory, wherein a first portion of the memory is associated with an application executing on the second processing unit and a second portion of the memory stores a device driver associated with the first processing unit and configured to:
register a file system and a page-fault routine with a virtual memory manager executing on the second processing unit, wherein each memory location in the file system corresponds to a different memory location in the buffer memory,
receive a page-in request from the virtual memory manager that includes a first memory location within the file system that corresponds to a second memory location within the buffer memory, and wherein a page requested by the application executing on the second processing unit is stored within the buffer memory at the second memory location,
in response to the page-in request, program the set of processor registers associated with the first processing unit based on a first set of instructions, wherein a first instruction in the first set of instructions causes the page requested by the application to be transmitted from the second memory location within the buffer memory to a third memory location within the second portion of the memory coupled to the second processing unit for storage, and
transmit a completion notification to the virtual memory manager indicating that the page requested by the application has been transmitted to the third memory location.

18. The computer system of claim 17, wherein the first processing unit is a graphics processing unit (GPU) and the second processing unit is a central processing unit (CPU).

19. The computer system of claim 17, wherein the device driver is further configured to register a write-back routine with the virtual memory manager.

20. The computer system of claim 19, wherein the device driver is further configured to:

receive a page-out request from the virtual memory manager that includes the third memory location when the page requested by the application is modified by the application;

program a set of buffer registers associated with the buffer memory based on a second set of instructions, wherein a first instruction in the second set of instructions causes the page modified by the application to be transmitted to the second memory location within the buffer memory for storage.

21. The computer system of claim 17, wherein the page requested by the application is a portion of data processed by the first processing unit for the second processing unit.

* * * * *